(12) United States Patent
Hatori

(10) Patent No.: US 8,782,636 B2
(45) Date of Patent: Jul. 15, 2014

(54) INFORMATION PROCESSING APPARATUS, CONTROL METHOD THEREOF, AND PROGRAM

(75) Inventor: Kenji Hatori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/973,126

(22) Filed: Dec. 20, 2010

(65) Prior Publication Data

US 2011/0173606 A1   Jul. 14, 2011

(30) Foreign Application Priority Data

Jan. 13, 2010   (JP) .................................. 2010-004852

(51) Int. Cl.
 *G06F 9/445* (2006.01)

(52) U.S. Cl.
 USPC ......................................................... 717/176

(58) Field of Classification Search
 USPC ................................................. 717/168–178
 IPC .......................................... G06F 11/1433,8/71
 See application file for complete search history.

(56) References Cited

U.S. PATENT DOCUMENTS

| 6,202,207 | B1* | 3/2001 | Donohue ....................... 717/173 |
| 2002/0078142 | A1* | 6/2002 | Moore et al. .................. 709/203 |
| 2002/0133420 | A1* | 9/2002 | McCoy et al. .................. 705/26 |
| 2007/0294684 | A1* | 12/2007 | Kumashiro et al. ........... 717/168 |
| 2009/0007097 | A1* | 1/2009 | Hinton et al. .................. 717/176 |

FOREIGN PATENT DOCUMENTS

| JP | 2002-189594 | | 7/2002 |
| JP | 2002-297390 | A | 10/2002 |
| JP | 2006-119897 | A | 5/2006 |
| JP | 2006-260476 | | 9/2006 |

OTHER PUBLICATIONS

Sep. 17, 2013 Japanese Office Action, issued in Japanese Patent Application No. 2010-004852.

* cited by examiner

*Primary Examiner* — Tuan A Vu
(74) *Attorney, Agent, or Firm* — Cowan, Liebowitz & Latman, P.C.

(57) ABSTRACT

An information processing apparatus is arranged to determine whether or not the software is installed from any one of the updater from the recording medium and the downloaded updater, in accordance with a type of the updater determined by a server based on version information of the software stored in the external recording medium and is also arranged to operate such that when the updater type includes a full updater, the software in the external recording medium is not installed but the full updater is downloaded from the server apparatus and installed, and when the updater type does not include the full updater, the software in the external recording medium is installed and a difference data is downloaded from the server and installed concurrently with it.

9 Claims, 4 Drawing Sheets

FIG. 2A

| TYPE OF UPDATER | VERSION BEFORE APPLYING | VERSION AFTER APPLYING | FILE NAME | |
|---|---|---|---|---|
| DIFFERENCE UPDATER | 1.0 | 1.1 | 10-11.UPD | ~205 |
| DIFFERENCE UPDATER | 1.1 | 1.2 | 11-12.UPD | ~206 |
| DIFFERENCE UPDATER | 1.2 | 1.3 | 12-13.UPD | ~207 |

FIG. 2B

| TYPE OF UPDATER | VERSION BEFORE APPLYING | VERSION AFTER APPLYING | FILE NAME |
|---|---|---|---|
| FULL UPDATER | UNDER 2.0 | 2.0 | 20.UPD |

FIG. 2C

| TYPE OF UPDATER | VERSION BEFORE APPLYING | VERSION AFTER APPLYING | FILE NAME | |
|---|---|---|---|---|
| FULL UPDATER | UNDER 2.0 | 2.0 | 20.UPD | ~208 |
| DIFFERENCE UPDATER | 2.0 | 2.1 | 20-21.UPD | ~209 |
| DIFFERENCE UPDATER | 2.1 | 2.2 | 21-22.UPD | ~210 |

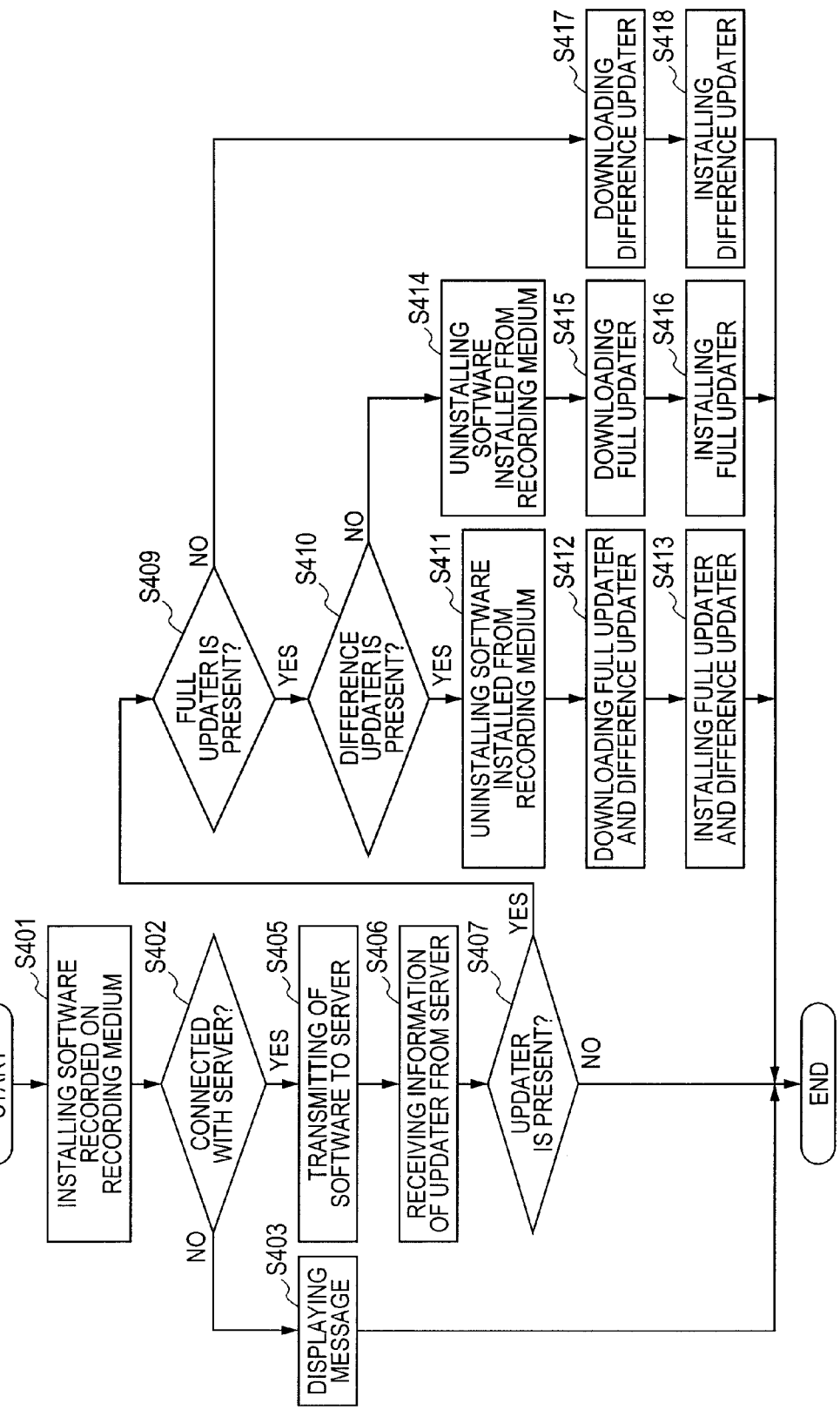

INFORMATION PROCESSING APPARATUS, CONTROL METHOD THEREOF, AND PROGRAM

BACKGROUND OF THE INVENTION

1. Field of the Invention

The present invention relates to a technique for installing software into an information processing apparatus.

2. Description of the Related Art

Hitherto, there is such a technique that when the software is activated after a personal computer (PC) installed software from a portable recording medium such as a CD or the like, the software is updated from a server on a network. For example, such a technique that if software of the latest version exists in the server on the network, the software is downloaded and installed, thereby updating the software to the latest version thereof, has been disclosed in Japanese Patent Application Laid-Open No. 2002-189594.

Such a technique that when a PC tries to install software from a CD, first, the PC refers to the server to determine whether or not software of the latest version exists in a server and, thereafter, updates the software, has also been disclosed in Japanese Patent Application Laid-Open No. 2006-260476. In this case, if the software of the latest version exists in the server, the PC downloads the software of the latest version from the server instead of installing without reading out the software from the CD. If there is no software of the latest version, software recorded on the CD is installed.

However, according to the technique disclosed in Japanese Patent Application Laid-Open No. 2002-189594, after the software was installed from the CD, when the software is activated, the software is also further downloaded from the server and installed. There is, consequently, such a problem that the installing operation is required repeatedly and it is troublesome to the user.

According to the technique disclosed in Japanese Patent Application Laid-Open No. 2006-260476, if the software of the latest version exists in the server, the software of the latest version is downloaded from the server instead of the CD and installed. In this case, there is such a problem that since a data amount of the software is large, it takes a time for downloading, so that a load of the server and a load of a communication path increase, and further, a waiting time which the user has to have before the download is completed becomes longer.

SUMMARY OF THE INVENTION

An aspect of the invention is to provide an information processing apparatus which can solve the above-described problems. That is, the information processing apparatus of the present invention comprises: a read-out unit configured to read out version information of software from an external recording medium; a transmitting unit configured to transmit a version number of the software to a server apparatus; a receiving unit configured to receive, from the server apparatus, type information regarding a type of updater determined by the server apparatus on the basis of the version number of the software; a determination unit configured to determine the type of updater shown by the type information; a first installing unit configured to install the software from the external recording medium if it is determined as a result of the determination that the type information does not indicate a full updater; a difference downloading unit configured to download a difference updater from the server apparatus concurrently with the install processing executed by the first installing unit; a second installing unit configured to install the difference updater downloaded by the difference downloading unit after the install processing by the first installing unit was finished; a full downloading unit configured to stop the install processing of the software from the external recording medium to download the full updater from the server apparatus, if it is determined as a result of the determination that the type information indicates the full updater; and a third installing unit configured to install the full downloaded by the full updater downloading unit.

According to the invention, when a client apparatus tries to install the software from the portable recording medium, install subject data is selected in accordance with the type of updater held in the server apparatus and installed. Thus, the downloading time and the waiting time which the user has to have are shortened and the loads of the server and communication path can be reduced.

Further features of the present invention will become apparent from the following description of exemplary embodiments with reference to the attached drawings.

BRIEF DESCRIPTION OF THE DRAWINGS

FIGS. 2A, 2B, and 2C are diagrams illustrating constructional examples of information regarding updaters.

FIG. 4 is a flowchart illustrating an operation of a client apparatus according to the second embodiment of the invention.

DESCRIPTION OF THE EMBODIMENTS

Exemplary embodiments of the present invention will now be described in detail in accordance with the accompanying drawings.

First Embodiment

Figure 1:
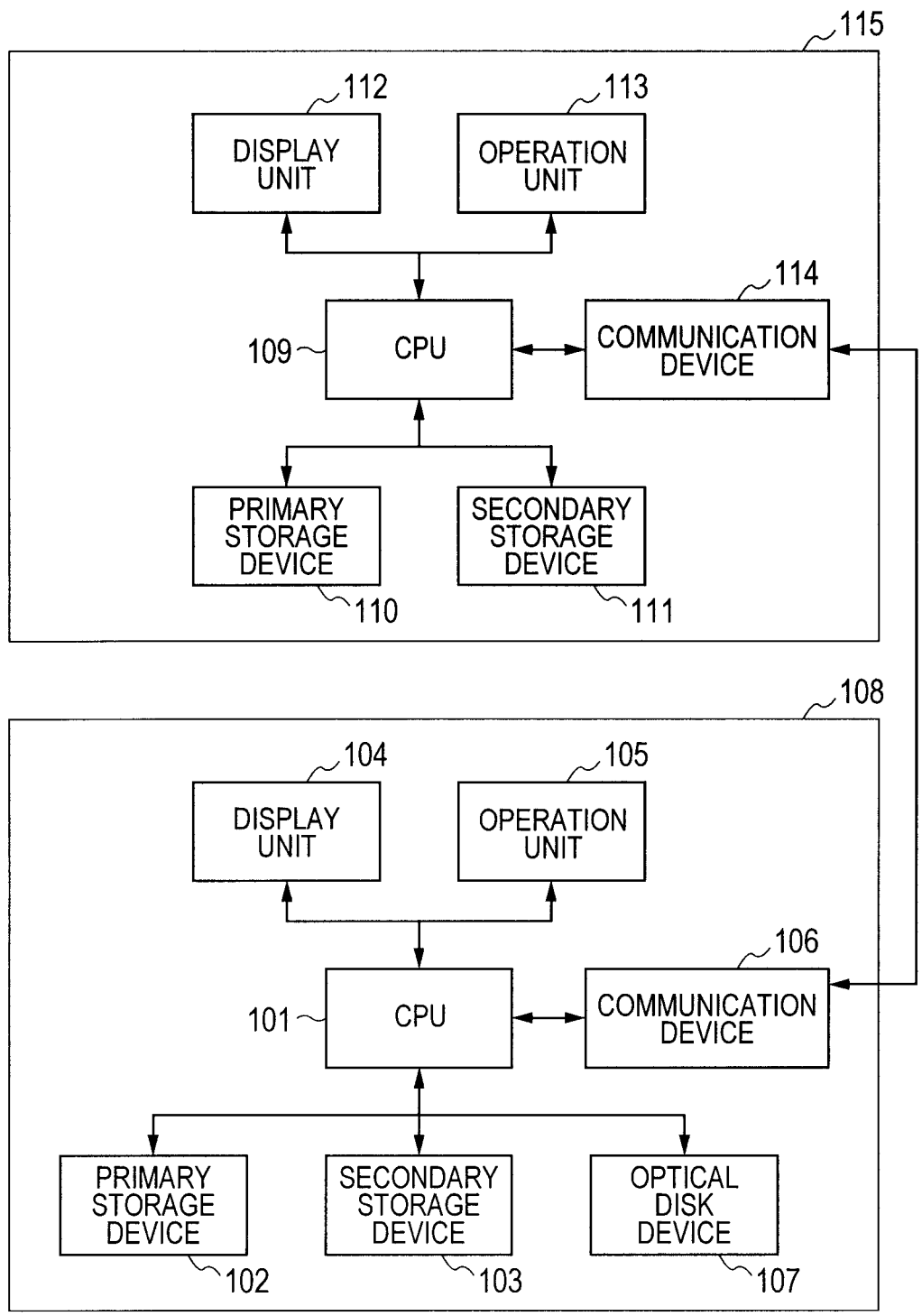
FIG. 1 is a block diagram illustrating a constructional example of an installing system of the invention.

FIG. 1 is a block diagram illustrating a constructional example of an installing system of the invention.

A client apparatus 108 is an information processing apparatus such as PC (Personal Computer) or portable telephone. In the embodiment, software is installed into the client apparatus 108. A CPU (Central Processing Unit) 101 controls the whole client apparatus. A secondary storage device 103 such as a hard disk or the like stores various applications. An application read out from the secondary storage device is stored into a primary storage device 102 such as a RAM or the like. A read-out device 107 reads out data recorded on a recording medium such as CD-ROM, DVD-ROM, memory card, or the like. A display unit 104 such as a liquid crystal display or the like is provided. An operation unit 105 such as keyboard, mouse, or the like is provided. A communicating device 106 is provided to communicate with another computer and can be constructed by, for example, an Ethernet (registered trademark) terminal. In this construction, the CPU 101 reads out the application from the secondary storage device 103, receives various kinds of data from the operation unit 105 and the storage devices, carries out operations and processings of the received data, and outputs the resultant data to a display unit 112 or the like in accordance with instructions of the read-out application.

A server apparatus 115 is an information processing apparatus such as a server computer or the like. In the embodiment, the server apparatus 115 is used to manage an updater of the software. A CPU 109 controls the whole server apparatus. A secondary storage device 111 such as a hard disk or the like stores various programs (software). The program read out from the secondary storage device is stored into a primary storage device 110 such as a RAM or the like. A display unit 112 such as a liquid crystal display or the like is provided. An operation unit 113 such as keyboard, mouse, or the like is provided. A communicating device 114 is provided to communicate with another computer and can be constructed by, for example, an Ethernet (registered trademark) terminal. In this construction, the CPU 109 reads out the program from the secondary storage device 111, receives various kinds of data from the operation unit 113 and the storage devices, carries out operations and processings of the received data, and outputs the resultant data to the storage device, the display unit, or the like in accordance with instructions of the read-out program. An updater to update the software is also stored in the hard disk 111.

FIGS. 2A, 2B, and 2C are diagrams illustrating constructional examples of information regarding the updaters. The information is formed by the server apparatus 115 or another information processing apparatus in response to the operation of the operator and has previously been stored in the secondary storage device 111 of the server apparatus 115. The information is transmitted from the server apparatus 115 to the client apparatus 108. In the invention, two types of updaters such as difference updater and full updater are prepared. The difference updater is an updater formed from a difference between the software of an old version and the software of a new version.

Specifically speaking, the difference updater is one file obtained by compressing only updated files and newly added files and collecting the compressed files. As compared with a case of distributing the updater including all software of the new version, in the case of distributing the difference updater, a size of updater is small. Therefore, a download amount decreases, so that a load of the server can be decreased and a waiting time which the user has to have can be shortened. The full updater is the software itself of the new version, includes all files constructing the new software, and is one file obtained by compressing those files and collecting the compressed files.

FIG. 2A illustrates an example in which all information regarding the updater is the difference updater. There are three updaters 205 to 207 here. The updater is constructed by the following four kinds of information 201 to 204. Reference numeral 201 denotes an updater type. In FIG. 2A, all updaters are the difference updaters.

Reference numeral 202 denotes a version of the software before the updater is applied and 203 denotes a version of the software after the updater was applied. As to an updater 205, this updater is applied to the software of the version 1.0, so that the version of the software is updated to the version 1.1 after the application of the updater. That is, this means that this updater is the updater in which only a difference from the version 1.0 to the version 1.1 exists. Similarly, as to an updater 206, a difference from the version 1.1 to the version 1.2 exists therein. As to an updater 207, a difference from the version 1.2 to the version 1.3 exists therein. Reference numeral 204 denotes a file name.

In the example of FIG. 2A, the software of the latest version 1.3 is obtained by applying three difference updaters 205 to 207 to the version 1.0. The software of the latest version 1.3 is obtained by applying the difference updaters 206 and 207 to the version 1.1. The software of the latest version 1.3 is obtained by applying the difference updater 207 to the version 1.2. The server apparatus 115 transmits information regarding the difference updaters as illustrated in FIG. 2A to the client apparatus 108 in the following case. That is, the information is transmitted when a data amount of a full updater of the version 1.3 is larger than the sum of data amounts of the difference updaters 205 to 207 from the version 1.1 to the version 1.3.

FIG. 2B illustrates an example in which the information regarding the updaters is only the full updater. The full updater is an updater formed by compressing all files constructing software of a certain version and collecting the compressed files into one file. FIG. 2B illustrates an example of the full updater to update to the version 2.0. "Full updater" has been written in the updater type 201. The version 202 before the application of the updater is a version under 2.0 and indicates that the software of a version under 2.0 can be applied. The version 203 of the software of a version after the application of the updater is 2.0. The file name 204 is 20.UPD. The server apparatus 115 is constructed so as to transmit the information regarding the updater in FIG. 2B to the client apparatus 108. That is, the information is transmitted when a data amount of the full updater of the version 2.0 is smaller than the sum of data amounts of the difference updaters from the version under 2.0 to the version 2.0.

FIG. 2C illustrates an example in which the information regarding the updaters includes both of the full updater and the difference updaters. This updater is effective in the case where after the full updater was once provided, the version-up is subsequently performed. Reference numeral 208 denotes a full updater of the version 2.0; 209 a difference updater from the version 2.0 to the version 2.1; and 210 a difference updater from the version 2.1 to the version 2.2. By applying the three updaters 208, 209, and 210 to the software of a version under 2.0, it becomes the latest version 2.2. Similarly, by applying the two updaters 209 and 210 to the software of the version 2.0, it becomes the latest version 2.2. Similarly, by applying the updater 210 to the software of the version 2.1, it becomes the latest version 2.2. The server apparatus 115 is constructed so as to transmit the information regarding the updaters in FIG. 2C to the client apparatus 108 when the following conditions 1 and 2 are satisfied.

Condition 1: The data amount of the full updater of the version 2.0 is smaller than the sum of the data amounts of the difference updaters from a version under 2.0 to the version 2.0.

Condition 2: The sum of the data amount of the full updater of the version 2.0 and the data amount of the updaters from the version 2.0 to the version 2.2 is smaller than the data amount of the full updater of the under 2.2.

Figure 3:
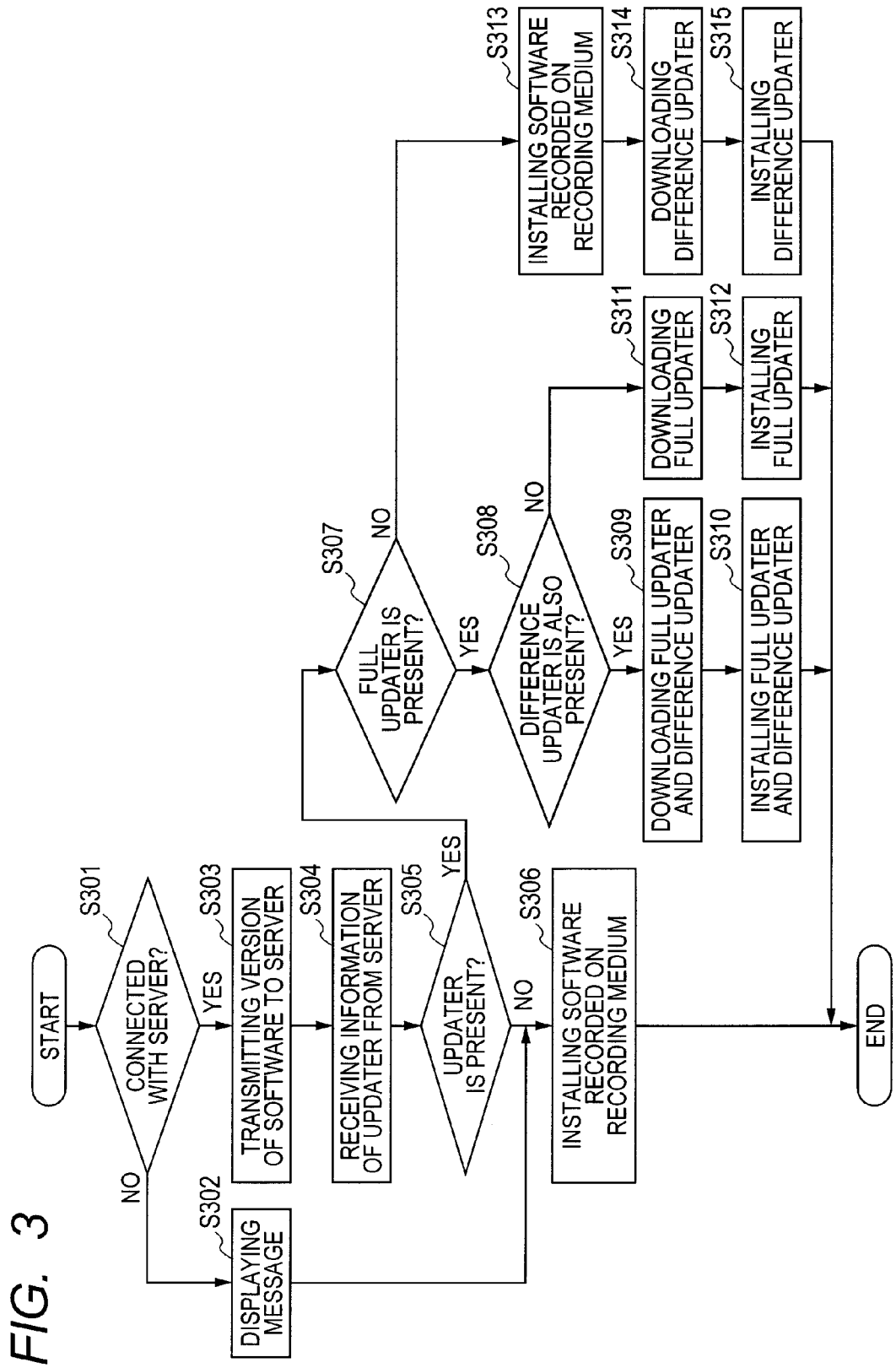
FIG. 3 is a flowchart illustrating an operation of a client apparatus according to the first embodiment of the invention.

FIG. 3 is a flowchart illustrating the operation which is executed when the client apparatus 108 installs the software. "Installation" is a preparation for enabling the client apparatus 108 to use the software and, further, indicates a processing for writing necessary set information into the secondary storage device 111. Specifically speaking, "preparation" denotes a processing for copying the files of the software to the secondary storage device 111 such as a hard disk or the like.

In order to install the software into the client apparatus 108, the user loads a recording medium such as a CD-ROM or the like into the read-out device 107 of the client apparatus 108. A program adapted to execute the installation (hereinbelow, called an "install program") has been recorded in the recording medium together with software to be subjected to install. First, when the CPU 101 reads out the install program from the recording medium into the primary storage device 110 and executes it, the CPU 101 determines whether or not the client apparatus can communicate with the server apparatus 115 through the communicating device 106 in accordance with the install program in step S301.

For example, if the communication cannot be performed because the client apparatus is not connected to the network, the server apparatus 115 is down, or the like, the CPU 101 displays a message showing such a fact on the display unit 104 in step S302. Or, when the server apparatus 115 is under a maintenance state or in the case where the server apparatus 115 has stopped a distributing service of the updaters, the message showing such a fact is also similarly displayed. In step S306, the CPU 101 reads out the software from the recording medium and installs. As mentioned above, when the client apparatus cannot connect with the server, the CPU 101 does not download the updaters from the server apparatus but reads out the software from the CD-ROM and installs. In this case, when the software is activated after that and the client apparatus can then connect with the server apparatus 115, the updaters are downloaded at that time with reference to the server apparatus 115 and the software can be also updated.

If the communication with the server apparatus 115 can be made in step S301, the CPU 101 transmits the version number of the software recorded in the recording medium to the server apparatus 115 in step S303. It is assumed that the version number has been written, for example, as a file in the recording medium.

When the server apparatus 115 receives the version number of the software through the communicating device 114, the CPU 109 transmits the types and file names of the updaters to be applied to the software of that version number to the client apparatus 108 (step S304). For example, it is now assumed that the version number of the software recorded in the recording medium is 1.0. If the information regarding the updater formed on the basis of the updaters held in the server apparatus 115 is the information corresponding to FIG. 2A, the updaters 205, 206, and 207 should be applied. Therefore, the types and file names of the updaters are transmitted to the client apparatus 108. The above case relates to an example in which all of the updaters to be applied are the difference updaters. Or, if the information regarding the updater formed on the basis of the updaters held in the server apparatus 115 is the information corresponding to FIG. 2B, the types and file names of the updaters are transmitted to the client apparatus 108. This case relates to an example in which the updaters to be applied are the full updaters. Or, if the information regarding the updater formed on the basis of the updaters held in the server apparatus 115 is the information corresponding to FIG. 2C, the updaters 208, 209, and 210 should be applied. Therefore, the types and file names of those updaters are transmitted to the client apparatus 108. This case relates to an example in which the updaters to be applied are both of the full updaters and the difference updaters.

In the case where the version of the software recorded in the recording medium is 1.3 and the information regarding the updater formed on the basis of the updaters held in the server is the information corresponding to FIG. 2A, the processing is executed as follows. That is, since the software recorded in the recording medium is the latest software and the updaters from the server apparatus 115 are unnecessary, a message showing such a fact is transmitted as information regarding the updater and the types and file names of the updaters to be applied are not transmitted. Therefore, the download and installation of the updaters are not performed.

Subsequently, in step S305, the CPU 101 determines the presence or absence of the updater as a download subject on the basis of the information regarding the updater from the server apparatus 115. If there are no updaters as download subjects, that is, if the software recorded in the recording medium is the latest software, the CPU 101 reads out the software from the recording medium and installs in step S306.

If the updaters exist in step S305, the CPU 101 determines the presence or absence of the full updater in step S307.

If there are no full updaters in step S307, this means that only the difference updater is present. In this case, the processing routine advances to step S313 and the CPU 101 reads out the software from the recording medium and installs. At the same time, the CPU 101 downloads the difference updater from the server apparatus 115 in step S314 on the basis of the file name obtained in step S304. By concurrently executing the install processing and the download processing as mentioned above, the time which is required to install the software of the latest version can be shortened. After completion of both of the installation of the software from the recording medium and the download of the difference updater, the CPU 101 executes a processing of step S315. That is, the downloaded difference updater is applied to the software installed into the client apparatus 108 from the recording medium, thereby updating the software to the latest version.

For example, in the case of FIG. 2A, the downloaded difference updater from the version 1.0 to the version 1.1 is applied to the version 1.0 of the software installed from the recording medium. Specifically speaking, the CPU 101 extracts the files from the difference updater and rewrites the files installed from the recording medium by using the extracted files. For example, assuming that there are ten kinds of files installed from the recording medium and the files corresponding to three kinds among them are included in the difference updater, those three kinds of files are replaced. Further, the difference updater from the version 1.1 to the version 1.2 is similarly applied and, subsequently, the difference updater from the version 1.2 to the version 1.3 is similarly applied. A new file may be included in the difference updater and, in such a case, the CPU 101 installs the new file and newly adds it.

If the full updater is present in step S307, the CPU 101 also determines the presence or absence of the difference updater in step S308. If the difference updater is absent, this means that only the full updater is present. In this case, the processing routine advances to step S311 and the CPU 101 downloads the full updater on the basis of the file name obtained in step S304. After completion of the download, the CPU 101 installs the full updater in step S312. Specifically speaking, the CPU 101 extracts the files from the downloaded full updater and installs them.

If the difference updater also exists in step S308, the processing routine advances to step S309 and the CPU 101 downloads the full updater and the difference updater. In step S310, the CPU 101 installs the full updater and the difference updater.

For example, if the information regarding the updater is the information corresponding to FIG. 2C, the CPU 101 extracts the files from the full updater corresponding to the file name of the downloaded full updater 208 and installs them. Thus, the software of the version 2.0 is installed into the client apparatus 108. Subsequently, the CPU 101 extracts the files from the difference updater corresponding to the file name of the difference updater 209 and performs the replacement of the files and the installation of the new file. Thus, the software is updated to the version 2.1. Subsequently, the CPU 101 installs the difference updater corresponding to the file name of the difference updater 210, so that the software is updated to the version 2.2.

In the embodiment, the data to be installed into the client apparatus 108 is switched over in accordance with the full updaters and the difference updaters of the software held in the server apparatus 115 and the version number of each software recorded in the recording medium.

As mentioned above, the information processing apparatus of the invention includes: the read-out unit configured to read out the software from the recording medium; the transmitting unit configured to transmit the version number of the software to the server apparatus; and the receiving unit configured to receive, from the server apparatus, the information regarding the updater corresponding to the version number of the software. The information which is received by the receiving unit includes at least information showing the type of updater and the version of the software to which the updater can be applied. The downloading unit downloads the updater from the server apparatus on the basis of the received information. Thus, in accordance with a determination result about whether or not the received information includes the information showing a predetermined type of updater, the installing unit determines from which one of the updater read out of the recording medium and the updater downloaded by the downloading unit the software is to be installed. Further, when the received information includes the information showing another type different from the predetermined updater type, the installing unit installs the downloaded updater on the basis of the version information included in the received information to the software installed in accordance with the determination. Particularly, when the received information includes the type information showing the software, the installing unit installs the updater corresponding to the type information showing the software without installing the software from the recording medium. When the received information includes the type information showing the difference data, the installing unit installs the updater corresponding to the type information showing the difference data as for the installed software in accordance with the information showing the version.

Further, the updater type is the software data and the difference data. When the received information includes the type information showing the software data, the installing unit installs the updater corresponding to the type information showing the software data without installing the software from the recording medium. When the received information includes the type information showing the difference data, the installing unit installs the updater corresponding to the type information showing the difference data as for the installed software in accordance with the information showing the version.

When the received information includes only the type information showing the difference data as type information, the updater corresponding to the type information showing the difference data is downloaded concurrently with the installation of the software from the recording medium.

Further, when the received information does not include the type information, the update processing such as download, installation, or the like of the updater is not executed.

According to the embodiment, the permission and inhibition of the read-out of the data from the recording medium and the download of the data from the server apparatus 115 can be switched over in accordance with the versions of the software held in the server apparatus 115 and the client apparatus 108. Thus, the installing time can be shortened.

Second Embodiment

In the second embodiment, first, the client apparatus 108 reads out the software from the recording medium and starts the installation irrespective of the information regarding the updaters held in the server apparatus 115. In the embodiment, the same portions as those in the first embodiment will be simply described and different portions will be described in detail.

FIG. 4 is a flowchart illustrating the operation in which the client apparatus 108 installs the software according to the embodiment.

When the user loads the recording medium into the read-out device 107 of the client apparatus 108, the CPU 101 reads out the software recorded in the recording medium and starts the installation in accordance with the install program. In the embodiment, the installation of the software recorded in the recording medium is started prior to determining whether or not the client apparatus can connect with the server apparatus 115. Therefore, as compared with the case of starting the installation after waiting for the response from the server apparatus 115, the installation can be finished earlier and the waiting time which the user has to have can be shortened.

In step S402, the CPU 101 determines whether or not the client apparatus can connect with the server concurrently with the install processing of the software from the recording medium in S401. If it cannot connect with the server, the CPU 101 displays a message showing such a fact in step S403. The CPU 101 continues the installation of the software from the recording medium. When the installation is completed, the CPU 101 finishes the whole processing.

If it is determined in step S402 that the client apparatus can connect with the server, the CPU 101 executes processings of steps S405 to S406. That is, the CPU 101 transmits the version number of the software recorded in the recording medium to the server and receives the types and file names of the updaters as information regarding the updaters from the server apparatus 115.

Subsequently, in steps S407, S409, and S410, the CPU 101 determines the updater type. This processing is the same as that in the first embodiment. The embodiment will be described hereinbelow separately with respect to the case where there are no updaters, the case where there are only the difference updaters, the case where there are only the full updaters, and the case where there are both of the full updaters and the difference updaters.

If there are no updaters in S407, the CPU 101 continues the installation of the software from the recording medium. When the installation is completed, the CPU 101 finishes the whole processing.

If it is determined in S407 that the updater is present and the full updater is absent and only the difference updaters are present in S409 (the case of FIG. 2A), the CPU 101 executes a processing of step S417. That is, the difference updater is downloaded concurrently with the installation of the software from the recording medium. When the installation of the software from the recording medium and the download of the difference updater are completed, the CPU 101 applies the difference updater to the software installed from the recording medium in step S418. If the version of the software recorded in the recording medium is equal to 1.3, since the software recorded in the recording medium is the latest version, there is no need to obtain the updater from the server apparatus 115. Therefore, such a fact is transmitted as information regarding the updater and the types and file names of the updaters to be applied are not transmitted. Therefore, the download and installation of the updater are not executed.

If it is determined in S407 that the updater is present, the full updater is present in step S409, and there are no difference updaters in S410, the CPU 101 stops the installation of the software from the recording medium in step S414. The CPU 101 deletes the files which have already been installed. If there is a change (rewriting of the set information, or the like)

made on the operating system at the time of the installation, the changed contents are also restored. That is, the CPU 101 uninstalls the software from the recording medium. In step S415, the CPU 101 downloads the full updater from the server apparatus 115 concurrently with the uninstall processing in step S414. When the uninstall processing in step S414 and the download processing in step S415 are completed, the CPU 101 installs the downloaded full updater in step S416.

If it is determined in S407 that the updater is present, the full updater is present in step S409, and the difference updater is present in S410, the CPU 101 executes a processing of step S411. That is, the CPU 101 stops the installation of the software from the recording medium and deletes the files which have already been installed. If the set information written in the secondary storage device exists at the time of the installation, it is also restored.

In step S412, the CPU 101 downloads the full updater and the difference updater from the server apparatus 115 concurrently with the uninstall in step S411. When both of the installation stop processing of step S411 and the download processing of step S412 are completed, the CPU 101 installs the downloaded full updater and, thereafter, installs the difference updater in step S413.

As described above, in the present embodiment, the installation of the software from the recording medium is executed concurrently with the transmission processing of the version number of the software by the transmitting unit. When the received information includes the type information showing the software data, the software installed from the recording medium is uninstalled and the updater corresponding to the type information showing the software is installed. Further, when the received information includes only the type information showing the difference data as type information, the updater corresponding to the type information showing the difference data is downloaded concurrently with the installation of the software from the recording medium. Therefore, the installation is also executed at the time of the connection with the server apparatus and the communication processing and the software can be installed and updated for a shorter time.

Although the invention has been described in detail above with respect to the exemplary embodiments, the invention is not limited to those specific embodiments but various modifications in the scope without departing from the spirit of the present invention are also incorporated in the invention. A part of the foregoing embodiments may be properly combined.

The invention also incorporates a case where a program of the software for realizing the functions of the embodiments mentioned above is directly supplied from the recording medium to a system or apparatus having a computer that can execute the program or is supplied to the system or apparatus by using wired/wireless communication and the program is executed.

Therefore, the program codes themselves which are supplied and installed into the computer in order to realize the functions and processings of the invention by the computer also realize the invention. That is, the computer program itself to realize the functions and processings of the invention is also incorporated in the invention.

In this case, any one of the program description forms such as object code, program which is executed by an interpreter, script data which is supplied to the OS, and the like may be used so long as it has the functions of the program.

As a recording medium for supplying the program, for example, a hard disk, a magnetic recording medium such as a magnetic tape, an optical/magnetooptic storage medium, or a non-volatile semiconductor memory may be used.

As a program supplying method, a method whereby the computer program which forms the invention is stored in the server on the computer network and the connected client computer downloads the computer program and executes it is also considered.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-004852 filed on Jan. 13, 2010 which is hereby incorporated by reference herein in its entirety.

What is claimed is:

1. An information processing apparatus including a processor arranged to communicate with a server apparatus via a communication unit, comprising:
    a read-out unit configured to read out version information of software from an external recording medium;
    a transmitting unit configured to transmit a version number of the software to the server apparatus via the communication unit;
    a first installing unit configured to install the software from the external recording medium;
    a determination unit configured to receive type information regarding a type of updater determined by the server apparatus on the basis of the version number of the software, from the server apparatus via the communication unit after the first installing unit starts installing the software from the external recording medium and determine the type of updater shown by the received type information;
    a full downloading unit configured to stop the install processing of the software by the first installing unit from the external recording medium and download the full updater from the server apparatus via the communication unit, in accordance with a determination result of the determination unit;
    a second installing unit configured to install the full updater downloaded by the full downloading unit;
    a difference downloading unit configured to download a difference updater from the server apparatus via the communication unit even when the first installing unit is installing the software, in accordance with the determination result of the determination unit; and
    a third installing unit configured to install the difference updater downloaded by the difference updater downloading unit in accordance with the determination result of the determination unit.

2. An apparatus according to claim 1, wherein the full updater includes all files constructing the software, and the difference updater includes only files as a difference between the files constructing the software and the files constructing the software of a version older than that of the software.

3. An apparatus according to claim 1, wherein a data amount of the full updater is larger than a data amount of the difference updater.

4. An apparatus according to claim 1, wherein:
    the first installing unit starts the install processing of the software stored in the external recording medium before the determination by the determination unit is executed; and
    the apparatus further comprises an uninstalling unit configured to, if the type information indicates the full updater as a result of the determination, stops the install processing of the software from the external recording medium to uninstall the files of the full updater which has already been installed.

5. An apparatus according to claim 1, wherein if the determination unit determines that the type information does not indicate the full updater, the difference downloading unit downloads the different updater from the server apparatus via the communication unit while the first installing unit is installing the software from the external recording medium, and the third installing unit installs the difference updater downloaded by the difference updater downloading unit after the first installing unit installs the software.

6. An apparatus according to claim 1, wherein if the determination unit determines that the type information indicates the full updater, the full downloading unit stops installing the software by the first installing unit to download the full updater from the server apparatus and the second installing unit installs the full updater downloaded by the full downloading unit, where the second installing unit uninstalls the software installed by the first installing unit to install the full updater.

7. An apparatus according to claim 6, wherein if the determination unit determines that the type information further indicates the difference updater, the difference downloading unit downloads the different updater from the server apparatus via the communication unit and the third installing unit installs the difference updater downloaded by the difference updater downloading unit.

8. A control method of an information processing apparatus for installing software, comprising the steps of:

reading out version information of the software from an external recording medium;

transmitting a version number of the software to a server apparatus;

installing the software from the external recording medium;

receiving, from the server apparatus after the first installing unit starts installing the software from the external recording medium, type information regarding a type of updater determined by the server apparatus on the basis of the version number of the software;

determining the type of updater shown by the received type information;

stopping the install processing of the software in the software install processing step from the external recording medium and downloading the full updater from the server apparatus, in accordance with a determination result of the determining step;

downloading a difference updater from the server apparatus even when the software install processing step is installing the software from the external recording medium; and installing the difference updater downloaded in the difference updater downloading step in accordance with the determination result of the determining step.

9. A non-transitory computer-readable reading medium storing a computer program comprising a program code for causing a computer to execute the control method according to claim 8.

* * * * *